United States Patent [19]

Heikkila

[11] Patent Number: 4,631,129
[45] Date of Patent: Dec. 23, 1986

[54] PRODUCTION OF PURE SUGARS AND LIGNOSULFONATES FROM SULFITE SPENT LIQUOR

[75] Inventor: Heikki Heikkila, Espoo, Finland

[73] Assignee: Suomen Sokeri Oy, Kantvik, Finland

[21] Appl. No.: 784,819

[22] Filed: Oct. 4, 1985

[51] Int. Cl.$^4$ ............................................. B01D 15/08
[52] U.S. Cl. ..................................... 210/635; 210/659; 127/30; 127/46.2; 127/55; 162/16; 162/36
[58] Field of Search ...................... 127/30, 46.2, 46.3, 127/55; 162/16, 36; 210/635, 656, 657, 658, 659

[56] References Cited

U.S. PATENT DOCUMENTS

| 4,008,285 | 2/1977 | Melaja | 127/46.3 |
| 4,366,060 | 12/1982 | Leiser | 210/659 |
| 4,379,751 | 4/1983 | Yoritomi | 210/659 |
| 4,391,649 | 7/1983 | Shimizu | 127/46.2 |

OTHER PUBLICATIONS

Proceedings of the Technical Association of the Pulp and Paper Industry, 1982 International Sulfite Pulping Conference, pp. 165-170, Toronto, Ontario, Oct. 20-22, 1982.

The Ekman-Days 1981, Poster Sessions 1 & II, vol. 5, International Symposium on Wood and Pulping Chemistry, Stockholm, Jun. 9-12, 1981.

*Primary Examiner*—Ernest G. Therkorn

*Attorney, Agent, or Firm*—Brumbaugh, Graves, Donohue & Raymond

[57] ABSTRACT

Sulfite spent liquor is subjected to a two-step chromatographic separation to form substantially purified fractions of sugars and lignosulfonates. The process for the separation of sugars and lignosulfonates comprises the steps of
(a) introducing sulfite spent liquor with a pH of 2.5 to 3.5 onto a chromatographic column containing a resin in metal salt form;
(b) eluting the sulfite spent liquor from the column with water to recover a substantially sugar-free lignosulfonate-rich fraction and a sugar-rich fraction;
(c) collecting the sugar-rich fraction for further purification;
(d) adjusting the pH of the collected sugar-rich material to between 5.5 and 6.5 and introducing the material onto a second chromatographic column containing a resin in monovalent salt form; and
(e) eluting the sugar-rich material from the second column with water, whereby a second sugar-rich fraction and a second lignosulfonate-rich fraction are formed. By this method, essentially all of the lignosulfonate is recovered in fractions which are substantially free of sugars, and essentially all of the sugars are recovered in a fraction which is substantially free of lignosulfonates.

9 Claims, 4 Drawing Figures

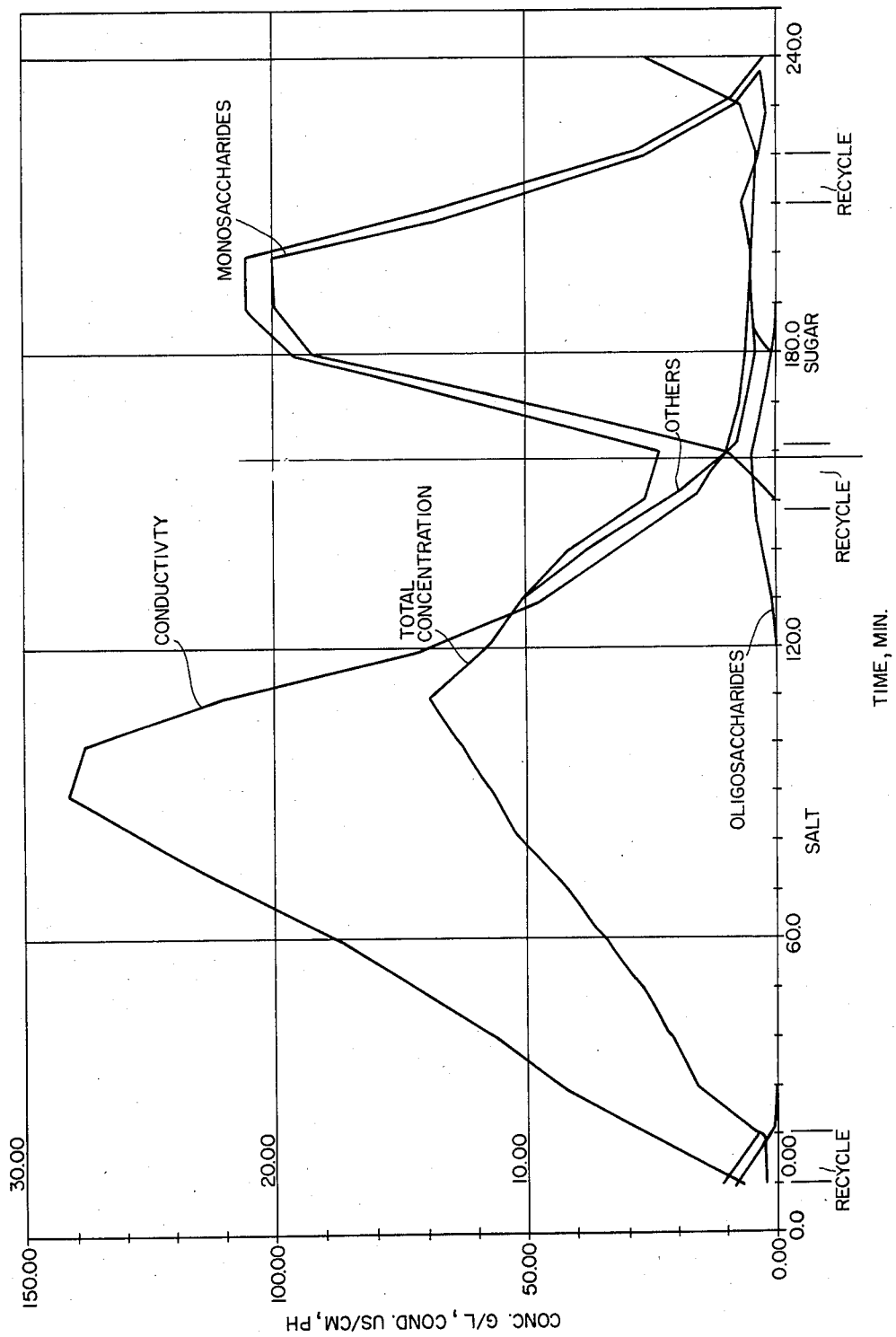

PRODUCTION OF PURE SUGARS AND LIGNOSULFONATES FROM SULFITE SPENT LIQUOR

BACKGROUND OF THE INVENTION

This invention relates to a chromotographic process for purifying sugars and lignosulfonates from sulfite spent liquor.

Sulphite spent liquors are produced as a waste product from the production of wood pulp via the sulfite process. These liquors contain undissolved wood solids, lignins, and hexose and pentose sugars, as well as chemicals introduced in the pulping process. In the past, these waste liquors were frequently discharged into streams. Environmental legislation has put a stop to this practice, however, and some alternative disposal techniques and uses for sulfite spent liquor have been developed.

A significant portion of the sulfite spent liquor produced in pulp making is evaporated and burned, primarily as a source of heat. This practice faces its own environmental difficulties, however, due to the high sulfur content of the sulfite spent liquor. Effective utilization will require the fractionation of the sulfite spent liquor into its components parts.

Hassi et al. have disclosed a single-step chromatographic separation for separating sugars and lignosulfonates from sulfite spent liquor. H. Hassi, P. Tikka and E. Sjostrom, The Ekman-Days 1981, Stockholm 1981, Preprints Vol. 5, p. 65; 1982 International Sulfite Pulping Conference, TAPPI Proceedings, p. 165. The process utilizes a strongly acidic polystyrene cation exchange resin crosslinked with divinylbenzene to isolate four fractions. Two lignosulfonate fractions, one of which is essentially free of sugars, are isolated, along with a predominantly sugar fraction which contains moderately low levels of lignosulfonates. The fourth fraction contains lignosulfonates and sugars in roughly equal amounts.

Because of the fourth fraction, which amounts to about 30% of the dry-solids content, the process of Hassi et al. does not result in good yields of purified materials from sulfite spent liquor. Moreover, the sugar fraction isolated still contained over 7% lignosulfonates, and the level of impurity would be expected to get worse as larger, commercial size columns were used. Thus, this separation technique does not provide an effective industrial method for separating sulfite spent liquors into essentially pure components with a high yield.

It is the object of this invention to provide a method for separating sulfite spent liquor into essentially pure sugar and lignosulfonate fractions.

It is a further object of this invention to achieve this separation at high yield, and on a scale suitable for industrial application.

SUMMARY OF THE INVENTION

According to the present invention, sulfite spent liquor is subjected to a two-step chromatographic separation to form substantially purified fractions of sugars and lignosulfonates. The process for the separation of sugars and lignosulfonates comprises the steps of (a) introducing sulfite spent liquor with a pH of 2.5 to 3.5 onto a chromatographic column containing a resin in metal salt form;

(b) eluting the sulfite spent liquor from the column with water to recover a substantially sugar-free lignosulfonate-rich fraction and a sugar-rich fraction;

(c) collecting the sugar-rich fraction for further purification;

(d) adjusting the pH of the collected sugar-rich material to between 5.5 and 6.5 and introducing the material onto a second chromatographic column containing a resin in monovalent salt form; and (e) eluting the sugar-rich material from the second column with water, whereby a second sugar-rich fraction and a second lignosulfonate-rich fraction are formed. By this method, essentially all of the lignosulfonate is recovered in fractions which are substantially free of sugars, and essentially all of the sugars are recovered in a fraction which is substantially free of lignosulfonates, salts and acids.

The separation process according to this invention is carried out on a sulfonated polystyrene divinyl-benzene column. If birch wood sulfite spent liquor is used as a feedstock, the final sugar fractions is 93% by weight of dry-solids monosaccharides, and the principal sugar is xylose. Spruce wood (soft woods) based feedstock leads to a sugar fraction in which the principal sugar is mannose.

BRIEF DESCRIPTION OF THE DRAWINGS

FIG. 4 is a graph of the elution of the sugar-rich fraction from birch wood sulfite spent liquor from a sulfonated divinylbenzene column in ammonium ion form at pH 5.5.

DETAILED DESCRIPTION OF THE INVENTION

Figure 1:
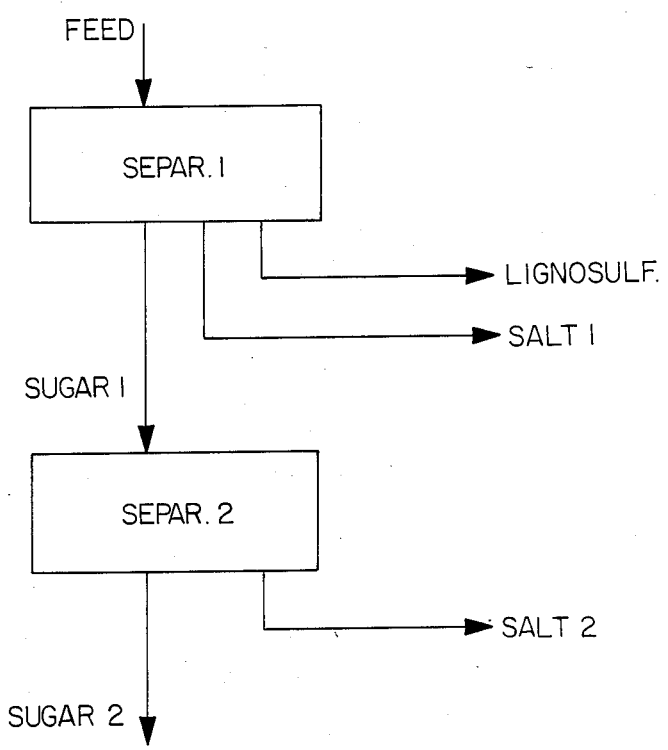
FIG. 1 is a schematic of the separation steps for Example 1.

The separation of sulfite spent liquor into substantially pure fractions comprising sugar and lignosulfonates is accomplished using a two-step chromatographic technique. Substantially pure, in this case, means that the recovered sugar is substantially free of lignosulfonates, and that the lignosulfonate is substantially free of sugars. These substantially pure fractions contain more than 95% of the sugars and 95% of the lignosulfonates originally present in the sulfite spent liquor, which constitutes a substantial improvement in recovery over prior art methods.

According to the present invention, sulfite spent liquor is, if necessary, adjusted to a pH below 3.5, preferably between 2.5 and 3.5, prior to being introduced onto the first chromatography column. The pH can be adjusted using concentrated mineral acids, or $SO_2$. $SO_2$ or $H_2SO_4$ are particularly suitable for the purpose. Preferably, the sulfite spent liquor is first adjusted to 50 weight % (by dilution or concentration), and filtered to remove undissolved material.

The first separation step is carried out on a strongly acidic resin in metal salt form. The preferred resin is a sulfonated polystyrene divinylbenzene and the metal ion is preferably the metal ion of the spent liquor. Usually, the desired metal ion is calcium or sodium. After loading the sulfite spent liquor, the column is eluted with water.

Three fractions are recovered from the first column. The lignosulfonate fraction contains about 20% by weight dry solids, which comprise about 90% lignosulfonates, and 0% sugars. The sugar fraction contains about 18% by weight dry solids, of which about 45% is sugars. The third fraction, designated salt 1 contains about 22% by weight dry solids. The salt 1 fraction contains about 70% lignosulfonates and 1% sugars.

After the first separation, the sugar fraction, which still contains lignosulfonates, is subjected to a second chromatographic separation. The column used in this case is sulfonated polystyrene divinylbenzene resin in a monovalent ion form. The preferred ion is sodium, although ammonium ion can be used if care is taken to avoid prolonged treatment. The pH of the sugar fraction is then adjusted to pH 5.5 to 6.5 using alkali metal hydroxides, particularly sodium hydroxide. However, if the first column was in calcium ion form, it may be necessary to soften the sugar fraction to avoid the precipitation of calcium salts and to improve the following separation. Any known method for softening may be used, including passing the sugar fraction through an ion exchange column or precipitating the calcium and filtering prior to adjusting the pH.

After adjusting the pH, the sugar fraction is filtered using filter-aid (for example diatomaceous earth) and loaded onto the second column. The column is eluted with water.

Two fractions are recovered from the second column, the final sugar fraction and a fraction designated salt 2. The sugar fraction contains up to 93% sugars by weight of dry solids and less than 2% lignosulfonates. The salt 2 fraction contains 4% sugars and 43% lignosulfonates by weight of the dry substance.

Each of the fractions recovered by this process may be evaporated to get a more concentrated, or a dry, composition. In particular, it is preferred to evaporate the initial sugar-rich fraction before loading it onto the second column. In addition, the lignosulfonate and salt fractions from the first and second separation may, if desired, be pooled.

As will be understood by one skilled in the art, the composition of the feed stocks will affect the amounts and compositions of the various fractions. For example, if a birch wood feed is used, the sugar fraction contains xylose as the predominant sugar. A spruce wood feed, on the other hand, yields a sugar fraction in which mannose is predominant.

EXAMPLE 1

A schematic for the separation of calcium lignosulphonate to obtain xylose and lignins is shown in FIG. 1. A material balance calculated for 100 kg dry solids is shown in table 1.

The raw material was calcium-sulphite spent liquor from birch wood. Crystalline xylose was obtained from sulfite spent liquor by the method of our invention. Two sulfite spent liquor solutions of different origins, coded FPC and RL respectively, were chromatographed. The analysis of the two SSL-solutions is shown in table 2. The sulfite spent liquor was diluted with water and filtered in a pressure filter using diatomaceous earth filter-aid. The diluted and filtered solution was then subjected to a chromatographic separation in conventional manner.

Figure 2:
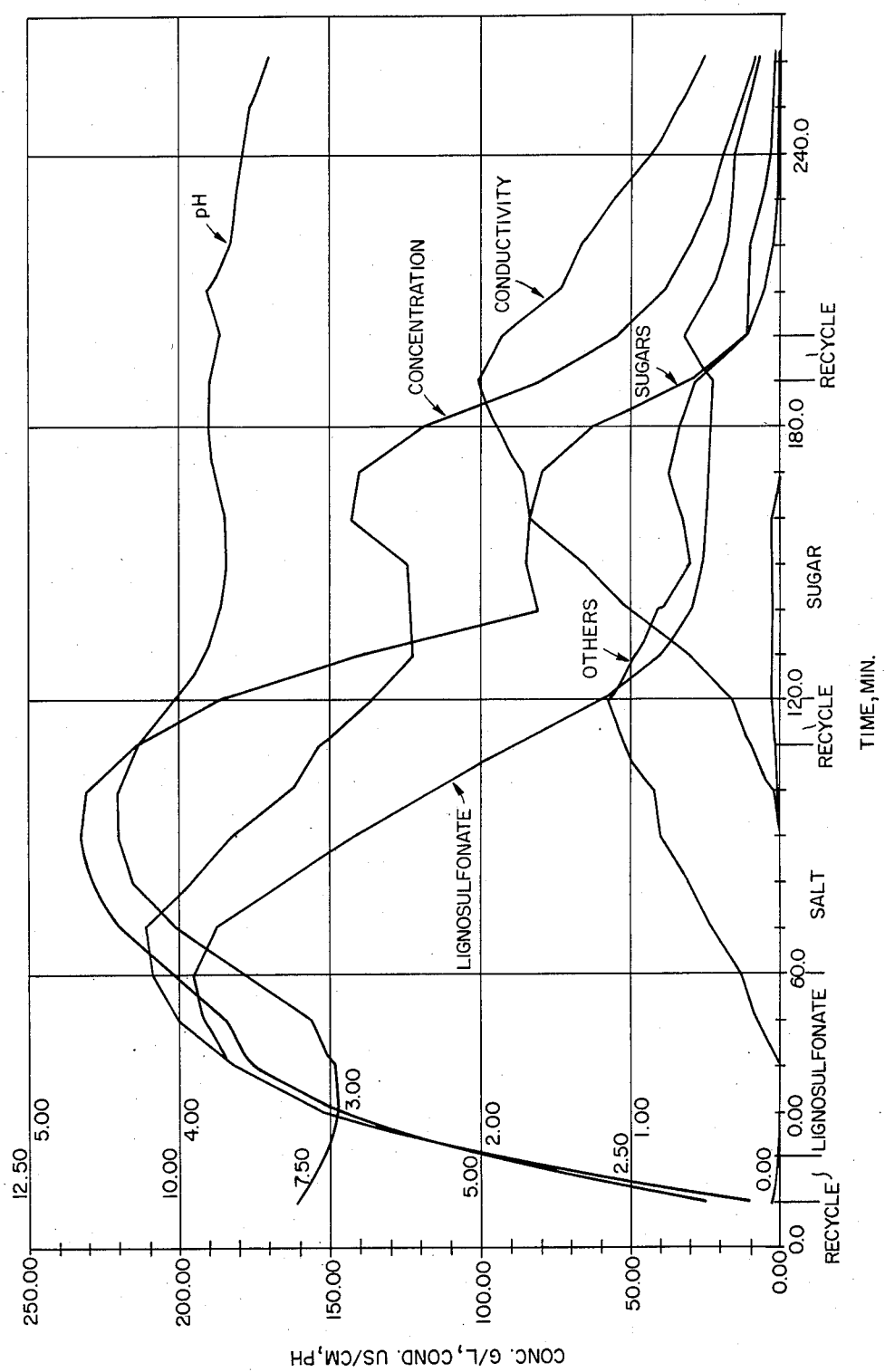
FIG. 2 is a graph of the elution of birch wood sulfite spent liquor from a sulfonated divinylbenzene column at a pH of about 3.5.

Column: Sulphonated polystyrene divinylbenzene (6.5%) resin in Ca-form. Mean particle size 0.41 mm (measured in Na-form), column diameter 0.6 m and bed height 6.0 m.
Temperature: 75 Centigrades
Flow rate: 200 liter/hour
Feed volumes: 200 and 240 liter respectively in the two runs.
Dry substance: 38 weight % of feed solution. The composition of the feed solutions is shown in table 2.
pH: 3.0
Eluent: Water Three fractions were recovered: a sugar-rich fraction which contained 50% monosaccharides by weight of dry solids, and a lignosulphonate-rich fraction which contained less than 2% monosaccharides by weight of dry solids and a salt fraction containing less than 5% monosaccharides. The results are presented in table 3, by weight of dry solids and the separation, including the approximate retention times associated with each fraction, is shown graphically in FIG. 2.

The sugar-rich fraction from the first separation was softened by ion-exchange treatment.

Ion exchange column: Sulphonated polystyrene divinylbenzene in sodium-salt form. (Regenerated with 10% NaCl solution).
Amount of resin: 80 liters
Flow rate: 80 liter/hour
Temperature: 35°–45 Centigrades The ion-exchange treatment decreased the calcium content from 1.8% and 0.8% respectively to less than 200 mg/kg dry solids. The softening is a conventional operation known from water treatment.

The softened solution was evaporated and neutralized to pH 5.5. The solution was then subjected to a second chromatographic separation.

Column: Sulphonated polystyrene divinylbenzene (5.5%) in sodium-salt form. Mean particle size 0.41 mm, column diameter 0.6 m, bed height 4.5 m.
Temperature: 65 Centigrades
Flow rate: 175 liter/hour
Feed amount: 100 and 110 liters respectively in the two runs.
Dry substance: 34 weight % of the feed solutions.
pH: 5.5
Eluent: Water We recovered a xylose-rich fraction which contained over 93% monosaccharides of dry solids. The results are presented in table 4.

The composition of the recovered salt-rich fraction from the second separation is shown in table 5. The lignosulphonates can be divided into 2-3 fractions useful as supplements in animal feed production or as raw material for the chemical industry.

From the xylose-rich fraction crystalline xylose was obtained by conventional evaporation and crystallization.

EXAMPLE 2

Separation of a sodium lignosulphonate solution from spruce wood: Recovery of mannose and lignins.

A sodium-sulfite spent liquor solution was subjected to a chromatographic separation on a column in sodium-salt form. Two product fractions were obtained: a lignin-rich fraction and a sugar-rich fraction which also contained the hydroxy acids. Between the two product fractions a salt-rich waste fraction was eluted. The separation was carried out as in example 1 under the following conditions:
Column: Sulphonated polystyrene-divinylbenzene (6.5%) resin in sodium salt form. Mean particle diameter 0.40 mm. Bed height 4.5 m, diameter 0.6 m.
Temperature: 75 Centigrades
Flow rate: 0.25 cubic meters per hour
Feed: 225 liters of filtered sodium lignosulphonate solution diluted with water to 40 weight % dry substance.
pH: 3.0
Feed composition:
  Lignosulphonates: 55.4% of d.s. (HPLC)
  Oligosaccharides: 0.3%
  Xylose: 3.9%
  Mannose: 12.5%
  Glucose: 3.9%
  Galactose: 1.7%
  Arabinose: 0.3%
  Rhamnose: 0.2%
  Others: 21.8%
Eluent: Water We recovered a sugar-rich fraction with the following composition:
  Lignosulphonates 7.8%
  Oligosaccharides 0.3%
  Monosaccharides 66.8%
  Others 25.1%

Of the monosaccharides 18% (of sugars) was xylose and 57% mannose. The sugar-rich fraction which also contained the hydroxy acids was subjected to a second chromatographic separation as in example 1 to recover mannose.

The lignosulphonate-rich fraction was eluted before the sugar fraction. Most part of the inorganic salts were eluted between the lignosulphonates and the sugars as a waste fraction.

Figure 3:
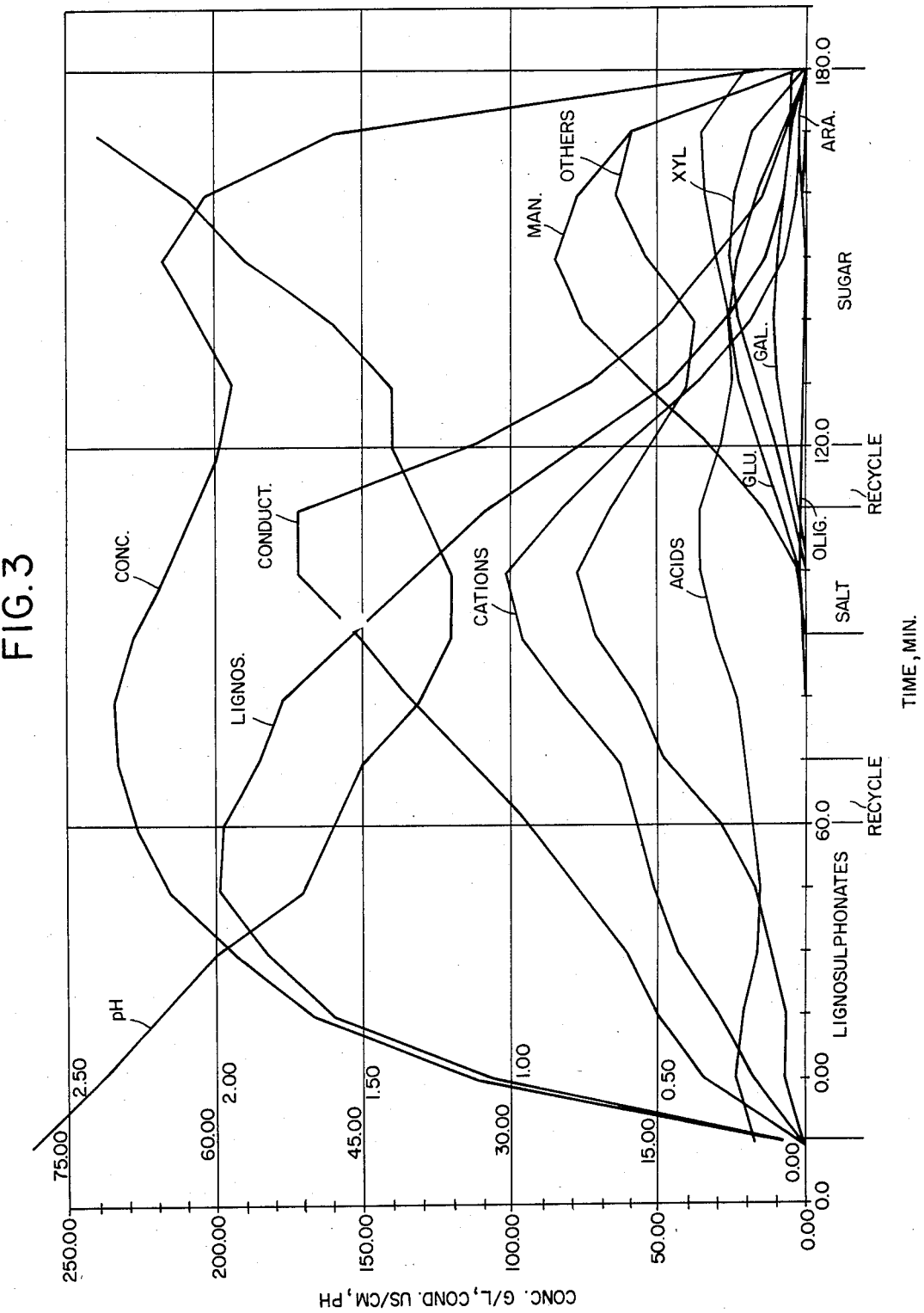
FIG. 3 is a graph of the elution of spruce wood sulfite spent liquor from a sulfonated polystyrene-divinyl-benzene column initially at pH 3.0.

The separation is shown graphically in FIG. 3, along with approximate retention times for the fractions.

EXAMPLE 3

Separation of xylose on a column in ammonium salt form.

A birch wood calcium-sulfite spent liquor solution was filtered and subjected to a chromatographic separation on a column in calcium salt form as in example 1. The recovered sugar-rich fraction was softened by precipitation of the calcium as calcium sulphate which was removed by filtration. After adjustment of the pH to 5.5 by $NH_4OH$ the sugar-rich solution was subjected to a second chromatographic separation on a resin column in ammonium salt form.
Column: Resin as in examples 1 and 2 with 4% divinylbenzene. Ammonium-salt form. Mean particle diameter 150 mesh. Bed height 70 cm diameter 4.5 cm.
Temperature: 65 Centigrades
Flow rate: 3 ml per minute
pH: 5.5
Feed volume: 100 ml of a solution containing 25 weight % dry substance.
Composition:
  Lignosulphonates 24.0% of d.s.
  Oligosaccharides 1.6%
  Xylose 42.3%
  Others 32.1%
Eluent: Water The separation is shown graphically in FIG. 4 including approximate retention times for each fraction. A xylose-rich solution which contained over 93% of d.s. monosaccharides was obtained.

The ammonium-form can be used for the separation if care is taken to avoid prolonged treatment, because ammonium ions are known to accelerate the deterioration of xylose.

TABLE 1

|  | kg dry subst. | Composition | | |
|---|---|---|---|---|
|  |  | monosac. | lignosulf. | others |
| Feed | 100 | 22.0% | 55.0% | 23.0% |
| Sugarfrac. 1 | 46 | 45.7 | 23.9 | 30.4 |
| Lignosulf. | 27.5 | — | 90.9 | 9.1 |
| Saltfrac. 1 | 26.5 | 3.8 | 71.2 | 25.0 |
| Sugarfrac. 2 | 21.5 | 93.0 | 1.9 | 5.1 |
| Saltfrac. 2 | 24.5 | 4.1 | 43.3 | 52.6 |

TABLE 2

Analysis of Sulfite Spent Liquor solutions from Example 1.

|  | Sample | |
|---|---|---|
|  | FRC | RL |
| kg dry solids in feed composition of feed* (% of dry solids) | 83.1 | 97.5 |
| oligosaccharides | 1.5 | 0.6 |
| monosaccharides | 23.6 | 15.3 |
| Xylose 18.1 |  |  |
| mannose 2.0 |  |  |
| glucose 1.1 |  |  |
| galactose 1.4 |  |  |
| arabinose 0.4 |  |  |
| rhamnose 0.5 |  |  |
| lignosulfonates | 56.4 | 64.7 |
| other | 18.5 | 19.4 |

*determined by liquid chromatography.

TABLE 3

Analysis of sugar-rich fraction after 1st chromtographic separation from Example 1.

|  | Sample | |
|---|---|---|
|  | FPC | RL |
| kg dry solids on fraction composition of product (% of dry solids) | 36.2 | 24.4 |
| oligosaccharides | 1.7 | 1.2 |
| monosaccharides | 50.0 | 50.0 |
| xylose 39.1% |  |  |
| mannose 4.1% |  |  |
| galactose 2.9% |  |  |
| arabinos 0.4% |  |  |
| rhamnose 1.0% |  |  |
| lignosulfonates | 18.0 | 22.0 |
| other | 30.3 | 26.8 |

TABLE 4

Analysis of sugar-rich fraction after 2nd chromatographic Separation from Example 1.

|  | Sample | |
|---|---|---|
|  | FPC | RL |
| kg dry solids on fraction composition of product (% of dry solids) | 26.6 | 21.1 |
| oligosaccharides | 1.2 | 1.0 |
| monosaccharides | 93.0 | 93.0 |
| xylose 73.0% |  |  |
| mannose 8.6% |  |  |
| glucose 3.7% |  |  |
| galactose 5.2% |  |  |
| arabinos 0.7% |  |  |
| rhamnose 1.7% |  |  |
| lignosulfonates | 1.5 | 1.8 |

TABLE 4-continued

Analysis of sugar-rich fraction after 2nd chromatographic Separation from Example 1.

| | Sample | |
|---|---|---|
| | FPC | RL |
| other | 4.3 | 4.2 |

TABLE 5

Analysis of salt-rich fraction from Example 1.

| | Sample | |
|---|---|---|
| | FPC | RL |
| kg dry substance in fraction | 17.3 | 15.1 |
| oligosaccharides | 1.0% of d.s. | 1.0% of d.s. |
| monosaccharides | 4.1 | 4.0 |
| lignosulfonates | 44.0 | 56.0 |
| other | 50.9 | 39.0 |

I claim:

1. A process for the separation of sugars and lignosulfonates from sulfite spent liquor comprising the steps of:
   (a) introducing sulfite spent liquor with a pH of 2.5 to 3.5 onto a chromatographic column containing a resin in metal salt form;
   (b) eluting the sulfite spent liquor from the column with water to recover a substantially sugar-free lignosulphonate-rich fraction and a sugar-rich fraction;
   (c) collecting the sugar-rich fraction for further purification;
   (d) adjusting the pH of the sugar-rich material to between 5.5 and 6.5 and introducing the material onto a second chromatographic column containing a resin in monovalent salt form; and
   (e) eluting the sugar-rich material from the second column with water, whereby a second sugar-rich fraction and a second lignosulfonate-rich fraction are formed.

2. A process according to claim 1, wherein the resin in steps (a) and (d) is sulfonated polystyrene divinylbenzene.

3. A process according to claim 1, wherein the metal salt in step (a) is a calcium salt, and the salt in step (d) is a sodium salt.

4. A process according to claim 1, wherein the dry solids of the second sugar-rich fraction comprise more than 90% monosaccharides.

5. A process according to claim 1, including the additional step of softening the sugar-rich fraction collected in step (c) before adjusting the pH.

6. A process according to claim 5, including the additional step of concentrating the softened sugar-rich fraction before adjusting the pH.

7. A process according to claim 1 or 6 including the additional steps of collecting and concentrating the second sugar-rich fraction.

8. A process according to claim 1, wherein the sulfite spent liquor is a birch wood sulfite spent liquor and the principal sugar recovered is xylose.

9. A process according to claim 1, wherein the sulfite spent liquor is a spruce wood sulfite spent liquor and the principal sugar recovered is mannose.

* * * * *